United States Patent [19]
Bell, Jr.

[11] Patent Number: 5,149,395
[45] Date of Patent: Sep. 22, 1992

[54] HANDHELD FLUID LEAK SEALING APPARATUS

[75] Inventor: Richard E. Bell, Jr., Tampa, Fla.

[73] Assignee: Hikes Point Industries, Inc., Temple Terrace, Fla.

[21] Appl. No.: 170,991

[22] Filed: Mar. 21, 1988

Related U.S. Application Data

[63] Continuation-in-part of Ser. No. 889,969, Jul. 28, 1986, abandoned.

[51] Int. Cl.$^5$ .............................................. B32B 35/00
[52] U.S. Cl. ..................................... 156/581; 156/94; 156/580
[58] Field of Search ...................... 156/580, 581, 583.8, 156/583.9, 583.91, 94, 97, 98; 152/367, 371; 81/15.2-15.7; 428/63; 264/36; 5/449-451; 138/97-99; 24/580

[56] References Cited

U.S. PATENT DOCUMENTS

| | | | |
|---|---|---|---|
| 1,608,111 | 11/1926 | Moore | 156/580 |
| 2,154,183 | 4/1939 | Raney | 156/583.9 |
| 2,193,514 | 3/1940 | Kendall | 156/580 |
| 2,296,162 | 9/1942 | Hanson et al. | 81/15.2 |
| 2,548,506 | 4/1951 | Vachon | 81/15.2 |
| 2,987,098 | 6/1961 | Daniel | 156/94 X |

FOREIGN PATENT DOCUMENTS 1251076  12/1960  France ........................ 24/580

*Primary Examiner*—Geoffrey L. Knable
*Attorney, Agent, or Firm*—Charles A. McClure

[57] ABSTRACT

Sealing leaks in pressurized membranes, such as waterbeds without depressurizing. Such a membrane is gripped manually at the leak locus and vicinity, thereby folding and compressing the membrane to segregate and to seal the leak locus temporarily—and also enabling it to be dried. Next a patch is adhered over the leak locus, after which the membrane is released to return to its original shape. Apparatus for performing the steps subsequent to such manual gripping of the membrane include a base member and a first clamp member, pivoted together, between which the folded membrane is compressed; also a second clamp member, which—with the base member—compresses a patch onto the membrane, sealing off the leak locus permanently. The respective pivoted members are disengageably engageable, configured so as to maintain each such compression until completion of the desired steps, whereupon manual flexing disengages them from one another.

1 Claim, 1 Drawing Sheet

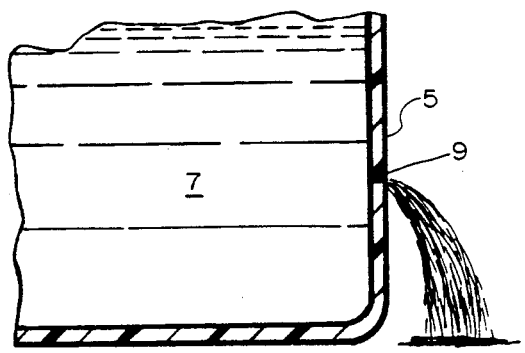
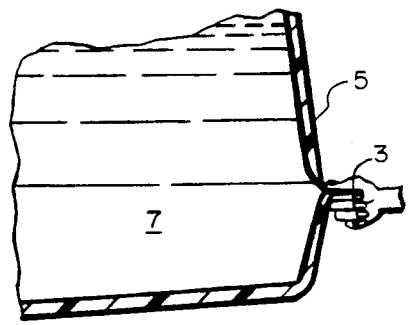
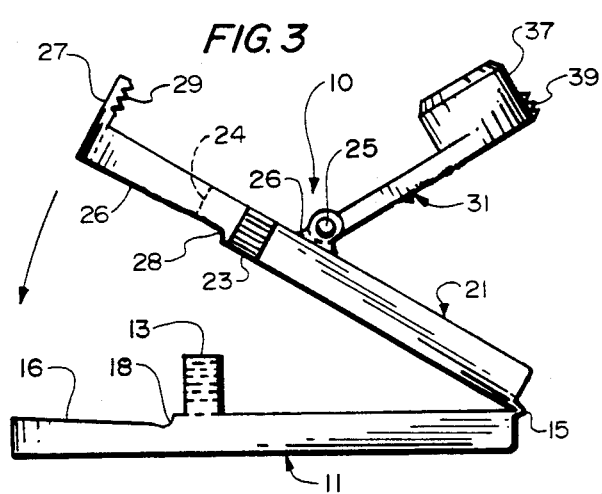
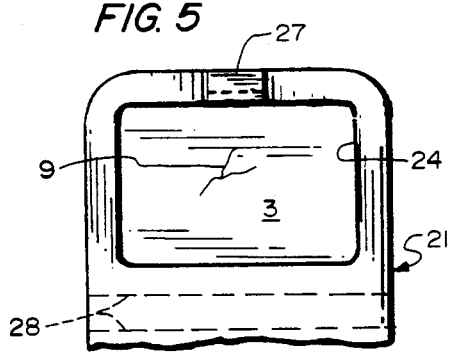
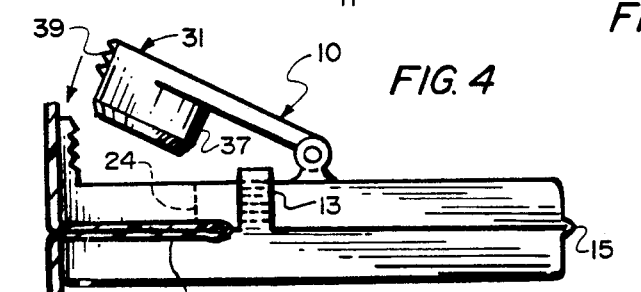
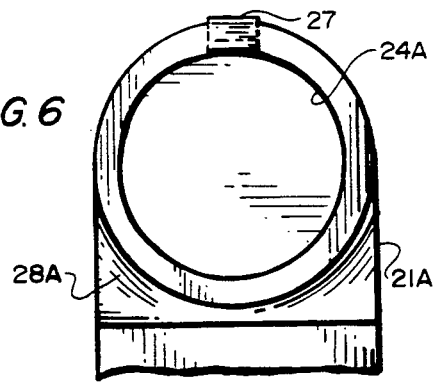
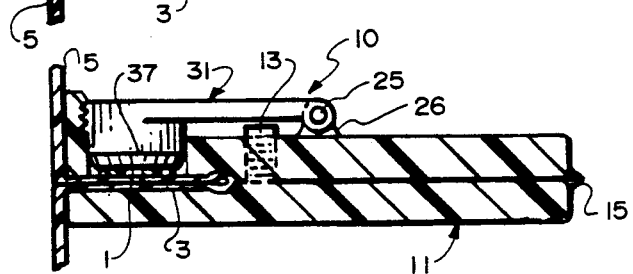
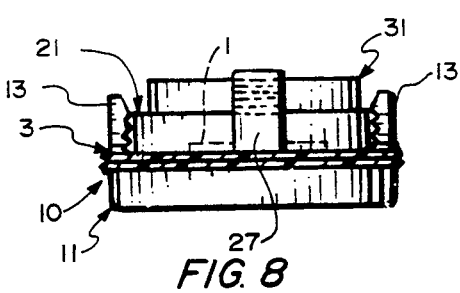

HANDHELD FLUID LEAK SEALING APPARATUS

This is a continuation-in-part of my patent application, Ser. No. 889,969 filed Jul. 28, 1986 and copending herewith, now abandoned.

FIELD OF THE INVENTION

This application relates to sealing of leaks in flexible membranes, especially pressurized membranes unduly difficult, expensive, or time-consuming to depressurize for sealing even though the pressure may be modest enough, as in a waterbed.

BACKGROUND OF THE INVENTION

This invention was stimulated by the necessity of sealing leaks in flexible membranes of waterbeds and the difficulty of draining such waterbeds, at least sufficiently to relieve the pressure in the vicinity of the leak so as to enable it to be sealed, as by the application of an adherent patch thereover. My solution to this problem does not require depressurization at all, much less complete emptying of the pressurizing fluid. Of course, in the instance of a waterbed the fluid is water, although other liquids might do as well or better. Similar principles apply to flexible membranes constraining gases at pressures low enough to enable the membrane to be folded.

Vachon U.S. Pat. No. 2,548,506 discloses a clamping and stretching tool for use in patching leaks in pneumatic tire tubes, and Kendall U.S. Pat. No. 2,193,514 discloses a somewhat similar inner tube repairing device, but those disclosures are not equivalent to the contents of the present specification, not only because a deflated inner tube is greatly different from a waterbed but also because those inventors thought in terms of a potentially leakable but static material to be sealed, rather than an actually leaking system otherwise in equilibrium.

SUMMARY OF THE INVENTION

In general, the procedural objects of the present invention are attained in patching a fluid leak at a locus in a flexible membrane exposed to atmospheric pressure at one face and to superatmospheric fluid pressure at the opposite face thereof, as by compressing an annular portion of the membrane surrounding the leak locus against an adjacent leak-free portion of the membrane. More particularly, this is accomplished by gripping the atmospheric-pressure face in the vicinity of the leak, compressing the gripped portions together temporarily along their common superatmospheric face and so sealing off the leak locus temporarily from the fluid. Finally a patch is adhered onto the atmospheric-pressure face of the membrane over the leak locus, thereby sealing off the former leak permanently.

In general, the apparatus objects of this invention are attained in sealing means for a leak locus in a flexible membrane exposed to superatmospheric fluid pressure along one face and to atmospheric pressure along its opposite face, and including means for temporarily compressing an annular portion of the membrane surrounding the leak locus against an adjacent leak-free portion of the membrane and thereby temporarily sealing the leak locus, and means for compressing an adhesive patch over such leak locus and within such annular portion and thereby permanently sealing the leak locus. More particularly, such apparatus is made up of base means, first clamp means pivoted thereto to compress membrane portions therebetween, and second clamp means pivoted to the first clamp means to compress a patch onto the leak locus. Preferably included are cooperating serrations temporarily latching the first clamp means against the base means and, separately, temporarily latching the second clamp means against the first clamp means.

A primary object of the present invention is to seal leaks in waterbeds without having to drain them.

Another object of this invention is to provide apparatus for sealing such leaks conveniently and expeditiously.

A further object of the invention is to accomplish the foregoing objects at relatively little expense.

Other objects of this invention, together with means and methods for accomplishing the various objects, will be apparent from the following description and the accompanying diagrams, which are presented by way of example rather than limitation.

SUMMARY OF THE DRAWINGS

FIG. 1 is a fragmentary sectional side elevation of a waterbed or like flexible membrane surrounding a pressurized fluid leaking therethrough at a leak locus at the right side of the view;

FIG. 2 is a similar view of the same membrane showing a part of the flexible membrane in the vicinity of the leak locus being gripped manually preparatory to being treated further according to the present invention;

FIG. 3 is a side elevation of apparatus useful according to this invention in an open position preparatory to receiving such gripped folded part of such pressurized membrane;

FIG. 4 is a side elevation of the apparatus of FIG. 3 while compressing the previously manually gripped folded part;

FIG. 5 is a fragmentary top plan view of a first embodiment of the leak locus end of part of the apparatus as in FIG. 4;

FIG. 6 is a fragmentary bottom plan view of a second embodiment of the leak locus end of such apparatus part;

FIG. 7 is a side elevation of the apparatus of FIGS. 3 to 6 compressing a patch against the locus of the membrane leak; and FIG. 8 is an end elevation of the apparatus of FIG. 7.

DETAILED DESCRIPTION

FIG. 1 shows in section a lower corner portion of waterbed or similar flexible membrane 5 containing fluid 7 (here, water) in liquid form, as some of such fluid is leaking out via leak locus 9 and collecting in a puddle outside.

FIG. 2 shows the same membrane portion similarly but with folded portion 3 thereof in the vicinity of the leak locus gripped between thumb and forefinger, deforming adjacent portions thereof. The membrane is so held in such manner as to close off the leak, and is held similarly by apparatus as described in detail below.

FIG. 3 shows leak-sealing apparatus 10 of this invention in open position. Featured are based 11, first clamp member 21 pivoted on integral hinge member 15, and second clamp member 31 pivoted on pin 25 retained in pair of journals 26 (one visible) secured to the top surface of the first clamp member about halfway between its hinged and free ends. Upstanding from the base somewhat left of center are lateral pair of resilient latching strips 13—only one visible in this view, cf. FIG. 8—serrated on their inner faces, as indicated by broken lines here. Each such strip is located to engage serrated band 23 on the adjacent side of the first clamp member when pivoted downward in the direction of the arcuate arrow. At the left end of second clamp member 21 is upstanding resilient latching strip 27 with serrated face 29 facing toward the right in this view and located to engage serrated band 39 on the outer end surface of head 37 on the free end of the second clamp member. The upper surface of the base member exhibits ramp 16 sloping downward from the free end at the left to transverse recess 18 near latching member 13. Similarly, the overlying bored lower surface of the first clamp has oppositely sloping ramp 26 terminating at similar transverse recess 28—and also has bore 24 therethrough so as to accommodate head 37 of the second clamp member when it is pivoted downward (as in succeeding views).

FIG. 4 shows the same leak-sealing apparatus from the side, with first clamp member 21 pivoted down into juxtaposition with base member 11, with fold 3 of flexible membrane 5 therebetween. The ramping of the apparatus surfaces contiguous with the fold ensures that membrane 5 is held securely at the junction of the fold to its adjacent unfolded portions and is relatively evenly compressed around the leak locus. The closed end of fold 3 is enabled by adjacent recesses (v. 18 and 28 in FIG. 3) to curve through nearly a circle without bending so much as to rupture.

FIG. 5 shows, from above, clamped fold 3 and the generally rectangular annular part of clamp member 21 about leak locus 9. No attempt is made here to show adjoining parts of the membrane. Indicated in broken lines is generally semicylindrical transverse recess 28 in the under or clamping surface of this clamp member.

FIG. 6 shows, from below, the annular clamping end of an alternative embodiment of first clamping member, designated 21a, which is generally circular rather than rectangular. Recess 28a is more extensive (following the adjacent circular outline) than in the previous embodiment—as the compressed membrane will do. It will be understood that in this embodiment, as in the previous one, the adjacent ramped and recessed upper surface of the base member will mirror the overlying under surface of the first clamp member—except for lacking the bore through the latter, of course.

FIG. 7 shows, in sectional elevation, apparatus 10 with head 37 of the second clamp member swung down into the bore in the first clamp member and with patch 1 overlying the leak locus in folded part 3 of the clamped membrane. In this configuration serrated band 39 on the head engages serrated face 29 on latching member 27 of the second clamp member, thereby compressing the patch against the adjacent surface of the membrane fold (over the leak locus) until member 27 is flexed manually to release the head to swing back upward—or until pair of strips 13 are flexed laterally to release first and attached second clampings member from the base.

FIG. 8 shows apparatus 10 in end elevation, with fold 3 of the flexible membrane clamped therein as in FIG. 7 and sectioned away across the end. Patch 1 is indicated in broken lines.

Operation of the described and illustrated apparatus of this invention, to practice the procedural method of the invention, is readily apparent and has been noted in part already. The leaking flexible membrane, including the leak locus therein, is gripped manually from the side that is at ambient or atmospheric pressure and is formed into a fold juxtaposing the corresponding surface portions thereof that are exposed to higher or superatmospheric pressure—from which a fluid is leaking through to the atmosphere. Such folded part is interposed between the free ends of the base member and the first clamp member of the apparatus of the present invention with the leak locus so located that juxtaposition of the clamping member against the base member will leave the leak locus visible through the bore in the clamp member. Then the clamp member is pivoted into such juxtaposition, engaging the lateral serrated bands with the respective upstanding serrated strips to latch the members together. This seals the leak temporarily by segregrating the leak locus from the rest of the flexible membrane throughout a surrounding annular portion thereof, and enables it to be dried.

Next a suitably shaped and sized patch is inserted manually into and through the clamp bore overlying the leak locus in the membrane fold. Then the second clamp member is pivoted to swing its head down into such bore to compress the patch against the surrounding part of the folded membrane. After whatever time is required to adhere the patch permanently in place, the ends of the upstanding serrated latching strips of the base member are manually flexed apart and free from the engaging serrated bands on the first clamp member, whereupon the fold slides out from between those two members and unfolds under the superatmospheric pressure of the contained fluid into its former position, with the former leak now permanently sealed. The end latching strip on the first clamp member is subsequently manually flexed to disengage the serrated band on the head of the second clamp member and enable it to be swung open and ready for the next use of the apparatus.

Patch compositions and methods of adhesion to the flexible membrane are readily matched to the membrane material. As many waterbeds are made of vinyl material, a variety of vinyl patches can be had very economically. Patches of artificial rubber, with or without reinforcement, are more suitable for rubber membranes.

No unusual materials or methods are required in construction of the apparatus of this invention. The base, clamping, and hinge or pivot members can be injection molded from any of many polymeric materials, either thermoplastic or thermosetting. Examples of such suitable materials include nylon, polyvinyl choride, and bakelite. The integrally formed hinge between the base and first clamping members can be replaced by a separate pivot arrangement, as between the first and second clamp members, or vice versa—as may be both convenient and economical. Alternative shapes of the clamping ends of the respective members have been suggested above, and others may come to mind upon reading this specification or otherwise becoming familiar with this invention, as by practicing it.

Still other modifications may be made, as by adding, deleting, combining, or subdividing parts or steps, while retaining at least some of the advantages and benefits of the invention—which itself is defined in the following claims.

The claimed invention:

1. Handheld waterbed-leak-sealing means for sealing leaks in waterbed membranes in situ without emptying water therefrom, comprising
elongated base means and elongated first clamp means manually juxtaposable at a free end portion of each to grip a folded part of a normally dry face of a waterbed membrane, whose opposite face is wetted and under fluid pressure, the gripped part including a non-leaking annular membrane portion ringing a leak locus therein, said first clamp means having a bore through such free end portion thereof positionable over the leak locus, and thereby adapted to seal it off temporarily pending application of a patch thereto; and second clamp means having a head end insertable through such bore in the first clamp means, and thereby adapted to compress a patch therein over the leak locus and into adherence to such annular portion of the membrane to seal off the leak permanently;

wherein such gripping end portions so juxtaposed are ramped apart from one another at increasing distance along the part of a waterbed membrane being gripped thereby from the rest of the waterbed.

* * * * *